United States Patent [19]

Gergoe

[11] Patent Number: 4,945,784

[45] Date of Patent: Aug. 7, 1990

[54] CABLE CONNECTOR ASSEMBLY

[75] Inventor: Bela Gergoe, Birmingham, Mich.

[73] Assignee: General Motors Corporation, Detroit, Mich.

[21] Appl. No.: 894,342

[22] Filed: Aug. 8, 1986

Related U.S. Application Data

[63] Continuation of Ser. No. 626,769, Jul. 2, 1984, abandoned.

[51] Int. Cl.[5] .............................................. F16C 1/10
[52] U.S. Cl. .............................. 74/501.5 R; 74/502.6; 292/DIG. 25; 292/DIG. 42
[58] Field of Search ................ 74/501 R, 501.5, 502, 74/512, 560; 292/336.3, DIG. 25, DIG. 14, DIG. 42, 225, 125; 29/434, 418, 446; 267/155, 74, 182; 242/107

[56] References Cited

U.S. PATENT DOCUMENTS

| | | | |
|---|---|---|---|
| 1,496,610 | 6/1924 | Shepard | 74/501 R |
| 1,607,736 | 11/1926 | Frank | 74/501 R |
| 2,018,706 | 10/1935 | Crawford et al. | 74/501 R |
| 2,243,758 | 5/1941 | Krause | 292/DIG. 14 X |
| 2,393,647 | 1/1946 | Marple | 292/DIG. 14 X |
| 2,957,354 | 10/1960 | Morrow | 74/501.5 X |
| 3,002,412 | 10/1961 | Andersen | 74/512 X |
| 3,447,229 | 6/1969 | Clark | 29/418 |
| 3,448,633 | 6/1969 | Jackoboice | 74/501.5 |
| 4,088,280 | 5/1979 | Arlauskas et al. | 242/107 |
| 4,159,809 | 7/1979 | Rawson | 242/107 |
| 4,182,198 | 1/1980 | Dartnell | 74/560 X |
| 4,197,763 | 4/1980 | Yamada | 74/501.5 |
| 4,382,482 | 5/1983 | Brandl et al. | 292/DIG. 14 X |
| 4,478,441 | 10/1984 | Fiordellisi et al. | 292/DIG. 25 |
| 4,585,258 | 4/1986 | Mochida | 74/501 R X |

FOREIGN PATENT DOCUMENTS

| | | | |
|---|---|---|---|
| 2836730 | 3/1979 | Fed. Rep. of Germany | 74/501 R |
| 663492 | 8/1929 | France | 74/501 R |

*Primary Examiner*—Rodney M. Lindsey
*Attorney, Agent, or Firm*—Herbert Furman

[57] ABSTRACT

A connector assembly for connecting a linearly shiftable cable to a lock structure includes a plastic housing which mounts a plastic lever, one arm of which is connected to the cable. The other leg of the lever has an abutment for engaging a release lever of the lock structure when the lever is rotated to operated position. A coil torsion spring surrounds a hub of the lever and has its legs engaging anchors on the arms of the lever. After the desired length of the cable is established and the cable secured to the one arm of the lever, installation of the connector assembly, the anchor of the one leg of the spring to the arm of the lever is broken so that the one leg of the spring can engage the housing and bias the lever to non-operated position.

3 Claims, 1 Drawing Sheet

CABLE CONNECTOR ASSEMBLY

This is a continuation of application Ser. No. 626,769 filed on July 2, 1984 now abandoned.

This invention relates generally to a cable connector assembly for connecting a linearly shiftable cable member to a rotatable lock operating member of a vehicle body lock structure.

The connector assembly of this invention is particularly useful for connecting a vehicle body lock structure to a remote operator to release the lock structure from a remote location within the vehicle body. The remote operator provides for power or manual release of the lock structure by either the driver or front seat passenger without requiring such person to leave the vehicle.

In its preferred embodiment, the connector assembly includes a housing of plastic material which is mounted to the lock housing. The housing includes an outer wall, a side wall and an integral post extending inwardly from the outer wall. A lever of plastic material includes a hub which is releasably secured to the post by partial peripheral ribs on the hub of the lever being snapped into a peripheral groove on the post. The linearly shiftable sheathed cable extends into the housing through the side wall thereof and also extends through an aperture in one arm of the lever. A conventional ball or other abutment is secured to the free end of the cable for engagement with the one arm of the lever to rotate the lever to operated position when the cable is shifted outwardly of the housing by the operator. This engages an abutment on the other arm of the lever with a detent or release lever of the lock structure to release the lock structure.

A coil torsion spring surrounds the hub of the lever with one leg of the spring engaging an anchor on the other arm of the lever and the other leg of the spring engaging the side wall of the housing to bias the lever to non-operated position relative to the housing wherein the lever is located by a stop on the other arm of the lever engaging a stop on the side wall of the housing.

The coil torsion spring is initially assembled to the lever with the one leg of the spring engaging the anchor on the other arm of the lever and the other leg of the spring engaging a frangible anchor on the one arm of the lever. This permits the lever to be mounted to the post of the housing, the cable sheath to be fixed to both the housing and to the operator, and one end of the cable to be fixed to the operator. The other end of the cable is freely slidable relative to the one arm of the lever after the operator and cable assembly are mounted in the vehicle body and the housing secured to the lock structure, the lever can be freely rotated to its non-operated position to thereby establish the length of the cable between the operator and the lever. The abutment is then fixed to the other end of the cable for engagement with the one arm of the lever. The frangible anchor is then broken off to release the other leg of the spring for engagement with the side wall of the housing to resiliently retain the lever in non-operated position. An aperture in the side wall of the housing permits the installation of the abutment on the cable and the breaking of the frangible anchor.

The primary object of this invention is to provide an improved cable connector assembly for connecting a linearly shiftable cable member to a rotatable member for releasing a vehicle body lock structure.

This and other objects will be readily apparent from the following specification and drawings wherein.

Figure 1:
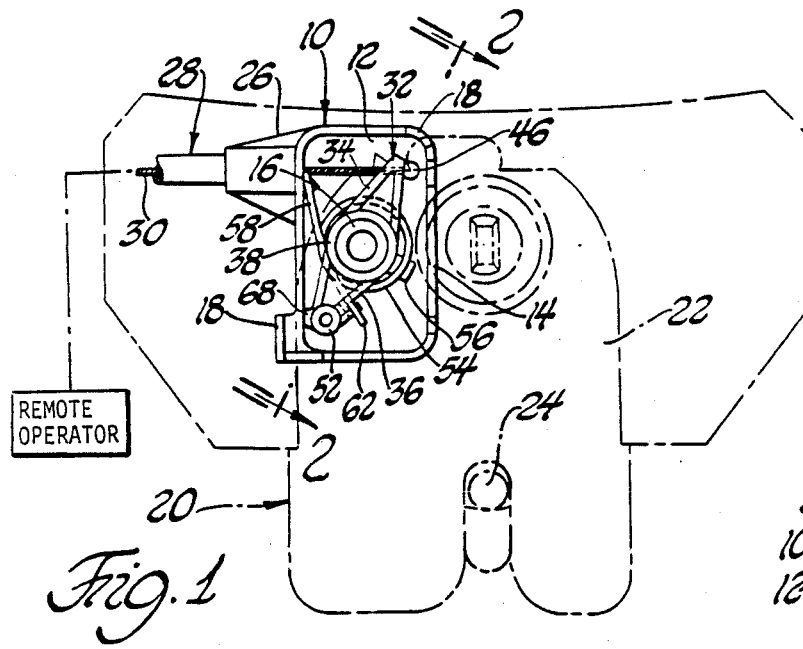
FIG. 1 is a view of a connector assembly according to this invention associated with a vehicle body deck lid lock.

Referring now to the drawings, a cable connector assembly according to this invention includes a molded plastic housing 10 having an outer wall 12 of generally rectangular configuration and surrounded by an integral inwardly extending side wall 14. A hollow post 16 extends inwardly from the outer wall within the side wall. The side wall includes integral extending tabs or fingers 18 which provide for securement of the connector assembly to the vehicle body lock structure to be operated. Such lock structure is shown in FIG. 1 in dash lines as a conventional deck lid lock 20 which includes a housing 22. Incorporated in the housing is a conventional fork type bolt and a detent for holding the bolt in locked position in engagement with the striker 24.

The side wall 14 of housing 10 includes an integral flanged hub 26 which receives and is secured to one end of the sheath of a cable assembly 28. The cable assembly is conventional and includes an outer sheath and an inner flexible cable 30 which is slidable within the sheath. The cable 30 extends through the hub 26 and into the interior of the housing 10. A lever 32 includes integral arms 34 and 36 of triangular shape and a hub 38. The arms are reinforced with ribs as shown which merge into the hub 38. The hub 38 includes a pair of integral radial inwardly extending partial ribs 40, FIGS. 3 and 4, which releasably snap into a continuous peripheral groove 42, FIGS. 2 and 4, of the post 16 in order to releasably rotatably mount the lever 32 to the post 16.

Figure 2:
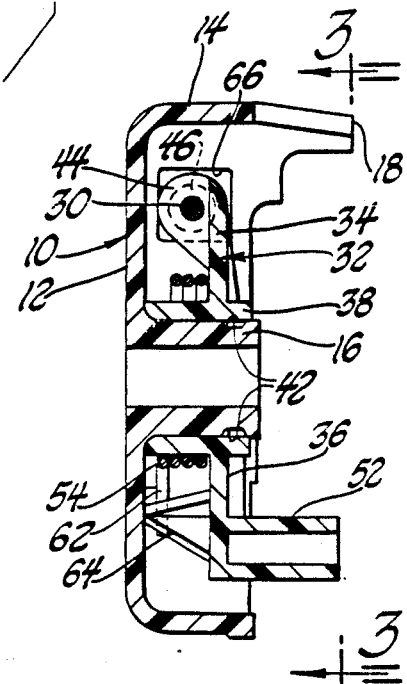
FIG. 2 is an enlarged view taken along the plane indicated by line 2—2 of FIG. 1.

An apertured flange 44 on the free end of the one arm 34 of the lever 32, FIG. 2, receives the cable 30 therethrough. The end of the cable to the other side of the flange has secured thereto a ball or similar abutment 46 to releasably secure the cable to the lever. The one side of the flange 44 includes an integral stop 48 which is engageable with an integral stop 50 of the housing wall 14 when the lever is rotated counterclockwise to an operated position, as will be described, The other arm 36 of the lever 32 includes an integral hollow post 52 which extends inwardly from the housing 10 and through an opening, not shown, in the housing 22 of the lock structure 20 for engagement with the release lever or detent of such lock structure. When the lever 32 is rotated counterclockwise, as viewed in FIGS. 1 and 3 the post 52 moves into engagement with such release lever or detent to release the bolt of the lock structure 20 from engagement with the striker 24.

A coil torsion spring 54 surrounds the hub 38. An integral radial tab 56 of the hub prevents engagement of the spring coils with the wall 12 of housing 10. One leg 58 of the spring, as shown in FIG. 5, initially engages a frangible integral right angle anchor or tab 60 on the lever arm 34 and the other leg 62 of the spring engages a lateral reinforced anchor or tab 64 of the arm 36 of the lever.

Figure 5:
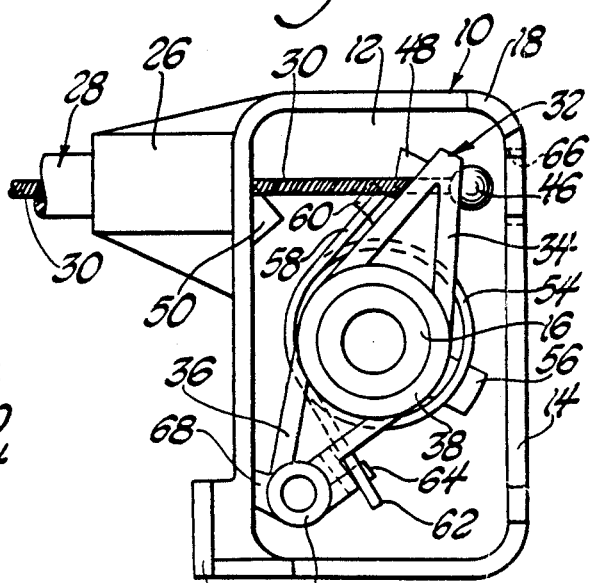
FIG. 5 is a view similar to FIG. 3 showing the connector assembly assembled but with the spring in retained position.

Initially the spring 54 is assembled to the lever 32 as shown in FIG. 5 with the legs 58 and 62 of the spring engaging the respective tabs 60 and 64. The lever can then be snapped to post 16 and be freely rotatable on the post. The spring 54 exerts no bias on the lever but is merely assembled to the lever as a module. The sheath of the cable assembly 28 can then be secured to the hub 26 of wall 14 and to the operator, not shown. One end of the cable can then be secured to the operator and the other end of the cable extended freely through the apertured flange 44 of the lever arm 34.

Figure 3:
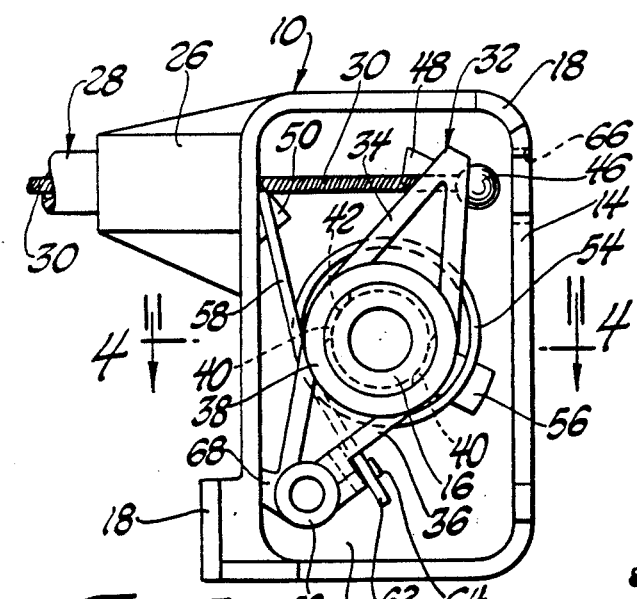
FIG. 3 is a view taken along line 3—3 of FIG. 2.
Figure 4:
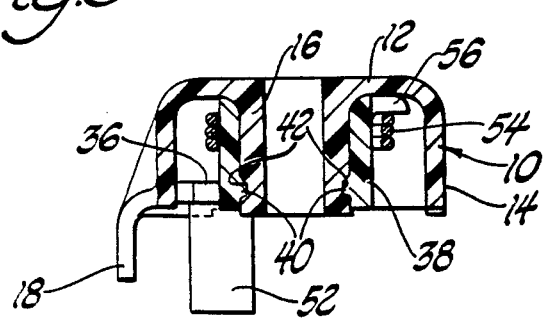
FIG. 4 is a sectional view taken along line 4—4 of FIG. 3.

The housing 10 is assembled to the lock structure 20 after the operator and the cable assembly 28 are installed on the vehicle body. The desired length of cable 30 is then established by rotating lever 32 to non-operated position and installing ball 46 through opening 66 in side wall 14. A suitable tool can then be inserted through opening 66 to break off the tab 60 and release the leg 58 of the cable for engagement with the wall 14 as shown in FIG. 3. This bias maintains stop 68 of lever arm 36 in engagement with the wall 14 to locate the lever in the non-operated position. Operation of the remote operator, not shown, by the driver or passenger rotates lever 32 to operated position to release the bolt of lock structure 20.

Thus this invention provides an improved connector assembly.

The embodiments of the invention in which an exclusive property or privilege is claimed are defined as follows:

1. A connector assembly for establishing the operating length of a cable member having one end connected to a remote operator and the other end connectable to a lock releasing member of a vehicle lock structure and fixing such length when established, the connector assembly comprising, in combination:
   a support mounted to the lock structure,
   a lever having a hub and a pair of arms,
   a first spring anchor on one arm of the lever and a second removable spring anchor on the other arm of the lever,
   a wound coil torsion spring coaxially preassembled with the hub of the lever,
   one leg of the spring engaging the first spring anchor and the other leg of the spring engaging the second removable spring anchor to assemble the spring in a wound prestressed condition with the lever as a preassembled unit,
   cooperating means on the hub of the lever and the support for freely rotatably mounting the preassembled unit of the spring and lever on the support,
   stop means on the lever,
   the preassembled unit being rotatable relative to the support to engage the stop means with the support and locate the lever in a non-operating position,
   means on the lever for moving the lock releasing member upon rotation of the lever,
   means for securing the other end of the cable member to an arm of the lever while the lever is located in the non-operating position to establish and fix the operating length of the cable member between the remote operator and the lock releasing member,
   the second removable spring anchor being removed after securement of the other end of the cable member to the other arm of the lever to release the other leg of the spring for engagement with the support to maintain the stop means in engagement with the support and maintain the lever in the non-operating position.

2. A connector assembly for establishing the operating length of a cable member having one end connected to a remote operator and the other end connectable to a lock releasing member of a vehicle lock structure and fixing such length when established, the connector assembly comprising, in combination,
   a support mounted to the lock structure and having an outer wall, a peripheral side wall provided with a pair of apertures and an open inner wall facing the lock structure,
   a lever having a hub and a pair of arms,
   a first spring anchor on one arm of the lever and a second removable spring anchor on the other arm of the lever,
   a wound coil torsion spring coaxially preassembled with the hub of the lever,
   one leg of the spring engaging the first spring anchor and the other leg of the spring engaging the second removable spring anchor to assemble the spring in a wound prestressed condition with the lever as a preassembled unit,
   cooperating means on the hub of the lever and the outer wall support for freely rotatably mounting the preassembled unit of the spring and lever on the outer wall of the support,
   stop means on the lever,
   the preassembled unit being rotatable relative to the support to engage the stop means with the support and locate the lever in a non-operating position,
   means on the lever engageable with the lock releasing member through the open wall of the support for moving the lock releasing member upon rotation of the lever,
   the other end of the cable member extending through one of the apertures in the side wall of the support,
   means for securing the other end of the cable member to an arm of the lever while the lever is located in the non-operating position to establish and fix the operating length of the cable member between the remote operator and the lock releasing member,
   the second removable spring anchor being removed by a tool inserted through the aperture in the side wall of the support after securement of the other end of the cable member to the other arm of the lever to release the other leg of the spring for engagement with the support to maintain the stop means in engagement with the support and maintain the lever in the non-operating position.

3. A connector assembly for establishing the operating length of a cable member having one end connected to a remote operator and the other end connectable to a lock releasing member of a vehicle lock structure and fixing such length when established, the connector assembly comprising, in combination,
   a support mounted to the lock structure and having an outer wall, a peripheral side wall provided with a pair of apertures, and an open inner wall facing the lock structure, a pivot on the outer wall,
   a lever having a hub and a pair of arms,
   a first spring anchor on one arm of the lever and a second removable spring anchor on the other arm of the lever,
   a wound coil torsion spring coaxially preassembled with the hub of the lever,
   one leg of the spring engaging the first spring anchor and the other leg of the spring engaging the second removable spring anchor to assemble the spring in a wound prestressed condition with the lever as a preassembled unit, the hub of the lever being mounted on the pivot of the outer wall of the support for freely rotatably mounting the preassembled unit of the spring and lever on the support, stop means on the lever, the preassembled unit being rotatable relative to the support to engage the stop means with the support and locate the lever in a non-operating position, means on the lever engageable with the lock releasing member through the open wall of the support for moving the lock releasing member upon rotation of the lever, the other end of the cable member extending through one of the apertures in the side wall of the support, means for securing the other end of the cable member to an arm of the lever while the lever is located in the non-operating position to establish and fix the operating length of the cable member between the remote operator and the lock releasing member, the second removable spring anchor being removed by a tool inserted through the other aperture in the side wall of the support after securement of the other end of the cable member to the other arm of the lever to release the other leg of the spring for engagement with the support to maintain the stop means in engagement with the support and maintain the lever in the non-operating position.

* * * * *